A. M. NEEPER.
CAR TRUCK SIDE FRAME.
APPLICATION FILED JUNE 22, 1911.

1,053,856.

Patented Feb. 18, 1913.

WITNESSES
James F. Callahan
M. E. Thomas

INVENTOR
Alexander M. Neeper

UNITED STATES PATENT OFFICE.

ALEXANDER M. NEEPER, OF PITTSBURGH, PENNSYLVANIA.

CAR-TRUCK SIDE FRAME.

1,053,856. Specification of Letters Patent. Patented Feb. 18, 1913.

Application filed June 22, 1911. Serial No. 634,760.

*To all whom it may concern:*

Be it known that I, ALEXANDER M. NEEPER, residing in the city of Pittsburgh, county of Allegheny, and State of Pennsylvania, have invented new and useful Improvements in Car-Truck Side Frames, of which the following is a specification.

My invention relates to forged or pressed car truck side frames and the objects of my improvements are to provide a car truck side frame made from a metallic bar of rectangular cross section in which the parts thereof performing the functions usually performed by the several arched bars and tie bars of frames made from arched bars and tie bars bolted together, are integral with each other, and adjustable means affixed to my improved car truck side frame for receiving and retaining the bolster of the car and the journal boxes of the wheels thereof.

My invention consists in a slitted bar of rectangular cross section; a car truck side frame made from said bar, preferably by pressing or forging; and adjustable means affixed to said car truck side frame for affixing the bolster of the car and the journal boxes of the wheels of said car to said frame.

Figure 1:
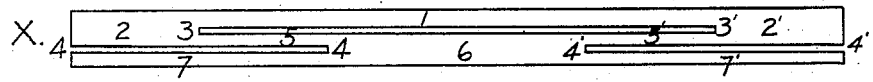
Figure 2:
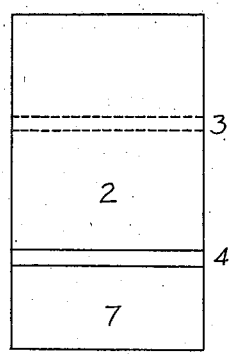
Figure 3:
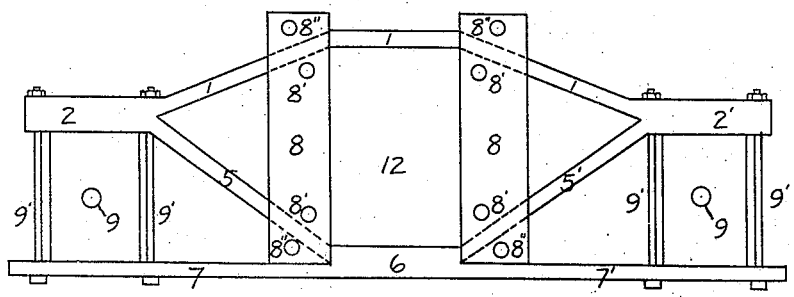
Figure 4:
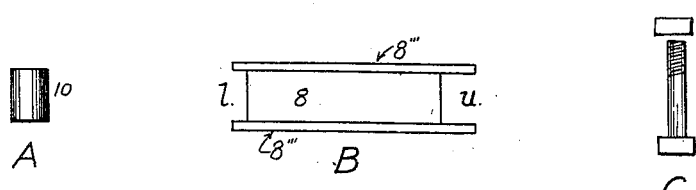

In the accompanying drawings which illustrate my invention Figure 1 shows the side elevation of my improved slitted and slotted bar X, of rectangular cross section. Fig. 2 is an enlarged end view of my improved bar X. Fig. 3 is a side elevation of my car truck side frame made from said bar X with the adjustable means of affixing the bolster and the journal boxes thereto shown thereon. In Fig. 4 B is a brace shown in side elevation; A is a sleeve adapted to be placed over bolt C when said bolt is placed through the bolt holes in brace B.

Similar reference characters refer to like parts throughout the several figures.

In Fig. 1, X is a bar of metal, preferably of steel of rectangular cross section; a slot 3—3' is made parallel to its upper surface and located about an equal distance on each side of its medial line, the slot terminating some distance from each end of the bar. 4—4, 4'—4' are two slits extending from the respective ends of the bar toward the medial line passing terminal points of slot 3—3'. The planes of the slot and the slits are parallel to the planes of the upper and lower surfaces of the bar. In the bar, 1 represents that portion of the bar which is above the slot 3—3'. 2 represents that portion of the bar between the end of the slot at 3 and the left hand of the bar as shown in the drawing, which is above slit 4—4. 2' represents that part of the bar which is between the right hand end of the bar as shown in the drawing and the end of the slot at 3' and above the slit 4'—4'. 5 represents that part of the bar which is between the left hand of the slot and the right hand end of the slit 4—4. 5' represents that portion of the bar which is between the end of the slot at 3' and the end of the slit 4'—4'. 6 represents that portion of the bar which is below the slot 3—3' and between the ends of the slits and the lower surface of the bar. 7 represents that portion of the bar which is below slit 4—4 and between said slit and the bottom surface of the bar. 7' represents that portion of the bar which is below slit 4'—4' and between said slit and the lower surface of the bar. These reference figures as thus described appear in the car truck side frame when the same is expanded as shown in Fig. 3 and show the relative positions and relations of the several parts of bar X when the same has been expanded to form the frame of my improved car truck side frame.

In making up the bar X a bar of rectangular cross section of suitable size is taken and the slot 3—3' is made therein by drilling or sawing or any suitable method substantially in the position and of the size as shown in Fig. 1. The slits 4—4, 4'—4' are made from the respective ends of the bar by sawing or drilling or other suitable method and in substantially the position and the dimensions shown in Fig. 1. When the bar has thus been slitted and slotted it is heated and by suitable press with suitable forming dies is pressed into the shape shown in Fig. 3. The various portions of the bars 1, 2, 2', 5, 5', 6, 7, 7', taking the positions and having the relations with reference to each other shown in Fig. 3.

In Figs. 3 and 4, 8—8 are channels having flanges 8''', 8''', which are longer at end *l* than at end *n*. Said channels are placed upon the car truck side frame so that the flanges thereof shall extend toward the ends of the side frame and inclose parts 1, 1, 5, and 5' of said frame and so that the webs thereof shall form two of the sides of bolster opening 12 in Fig. 3. Said flanges having holes 8', 8'', located as shown in Fig. 3, and so that bolts 11 of Fig. 4 may pass through said holes, which are opposite to each other in said flanges 8'''. Cylindrical sleeves 10 are placed opposite said holes in said flanges, so that the holes in the flanges and the holes in said sleeves shall be concentric. The bolts 11 are then passed through the holes in the flanges and the holes in said sleeves, and nuts 11' are affixed to said bolts 11. The sleeves 10 are of such diameter, that when bolts 11 are passed through them as aforesaid, the peripheries of said sleeves contact with the opposite sides of the members 1, 1, 5, 5', of the frame shown in Fig. 3 and forming the sides of opening 12. Said sleeves thus bolted on the opposite sides of said members hold said channels 8 in position upon the car truck side frame. The positions of said channels 8 on said car truck side frame may be varied by varying the diameter of said sleeves 10, and because thereof, said channels are adjustable on said car truck side frames. In Fig. 3, the opening between member 1 at the top of said figure and the inside edges of channels 8, 8 and part 6 of the frame, form an opening for the placing of the bolster of the car upon which said car truck side frame may be used. The parallelogram having the small circle 9 at each end of the truck side frame between 2—7 and 2'—7' respectively, represent journal boxes which are held in place between said last mentioned bars and the frame by bolts 9', 9', 9', 9'. The journal boxes may be of any suitable construction, as may said bolts 9', 9', 9', 9', which extend through 7 to 2 and through 7' to 2' respectively.

While the bar X is shown in Fig. 1 with the two end slits, these slits may be omitted and the bar formed with the slot 3—3' alone, the lower surface being then defined by the lines on the upper side of the slits 4—4 and 4'—4' and a straight line connecting the inner ends of said lines with said slits. In this case, the tie bar formed by the parts of bar X, 7, 7' and the lower part of 6, would not be attached to the frame composed of the bar which would be slotted only and from which the end slits would be omitted. A bar having only the slots could be expanded the same as the slitted and slotted bar and a car truck side frame would result which would be represented by those parts of the car truck side frame shown in Fig. 3 which are designated by, 2, 2', 1, 1, 1, 5, 5', and the upper half of 6. Such a car truck side frame would eliminate many of the bolts and devices which are at present necessary to construct the car truck side frame formed from arched bars.

The braces 8 may be of form different from those shown and described in the drawing and this specification; instead of channels, plates and distance pieces may be bolted together and used with like effect, so far as bracing and adjustability are concerned and so far as affording a means of adjustment and affixing a bolster to the car truck side frame may be considered. The same is true of the diagrammatic journal boxes and bolts shown in Fig. 3. Those shown are for the purpose of showing the adaptability of the truck side frame to receive and retain journal boxes of any suitable construction when accompanied by suitable devices for performing functions substantially like the functions performed by the bolts 9'.

What I claim as my invention is:

1. A car truck side frame made from a metal bar having a slot and two end slits, whose planes are parallel to the plane of said slot; said slot being expanded so that the parts of said bar forming the sides thereof will form an opening for the reception of a bolster, and the parts of said bar forming the sides of said slits being formed to provide openings for the reception of journal boxes.

2. A car truck side frame made from a metal bar having a slot and two end slits, whose planes are parallel to the plane of said slot, the sides of said slot being expanded and stretched so as to form an opening for the reception of a bolster, and the parts of said bar forming the sides of said slits being formed to provide openings for the reception of journal boxes and adjustable means mounted on said frame for affixing a bolster to said frame.

3. A car truck side frame made from a metal bar having a slot and two end slits, whose planes are parallel to the plane of said slot, the sides of said slot being expanded and stretched so as to form an opening for the reception of a bolster, and the parts of said bar forming the sides of said slits being formed to provide openings for the reception of journal boxes and means at each end of said frame to affix journal boxes thereto.

In testimony whereof I have signed my name in the presence of two subscribing witnesses.

ALEXANDER M. NEEPER.

Witnesses:
JAMES F. CALLAHAN,
MINNIE E. THOMAS.